United States Patent
Yamazaki

(10) Patent No.: US 7,558,424 B2
(45) Date of Patent: Jul. 7, 2009

(54) SCENE CHANGE DETERMINATION DEVICE/METHOD AND DATA TRANSFER DEVICE/METHOD

(75) Inventor: Yasuhiro Yamazaki, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 202 days.

(21) Appl. No.: 11/442,350

(22) Filed: May 30, 2006

(65) Prior Publication Data

US 2007/0195086 A1  Aug. 23, 2007

(30) Foreign Application Priority Data

Feb. 17, 2006 (JP) .............. 2006-040755

(51) Int. Cl.
*G06K 9/64* (2006.01)
*G06K 9/68* (2006.01)

(52) U.S. Cl. .................. 382/217; 382/236; 386/46; 375/240; 348/700

(58) Field of Classification Search ........... 382/209, 382/200, 217–222, 236; 386/46; 375/240–240.29; 348/154, 155, 451, 452, 700–702
See application file for complete search history.

(56) References Cited

U.S. PATENT DOCUMENTS

| | | | |
|---|---|---|---|
| 6,330,344 B1 * | 12/2001 | Kondo et al. | 382/107 |
| 6,731,684 B1 * | 5/2004 | Wu | 375/240.12 |
| 7,245,398 B2 * | 7/2007 | Namizuka | 358/2.1 |

FOREIGN PATENT DOCUMENTS

| | | |
|---|---|---|
| JP | 07-079431 A | 3/1995 |
| JP | 2000-324499 A | 11/2000 |

* cited by examiner

*Primary Examiner*—Aaron W Carter
(74) *Attorney, Agent, or Firm*—Arent Fox LLP

(57) ABSTRACT

The scene change determination device of the present invention comprises a first extraction unit for extracting a plurality of pixels used for determination from the first image data, a second extraction unit for extracting pixels corresponding to the pixels extracted from the first image data, an accumulation unit for accumulating differences in value between the corresponding pixels extracted by the first and second extraction units and a determination unit for determining whether an accumulated value per image data exceeds a threshold value. The first and second extraction units slides and extracts the plurality of pixels used for determination for each field.

8 Claims, 15 Drawing Sheets

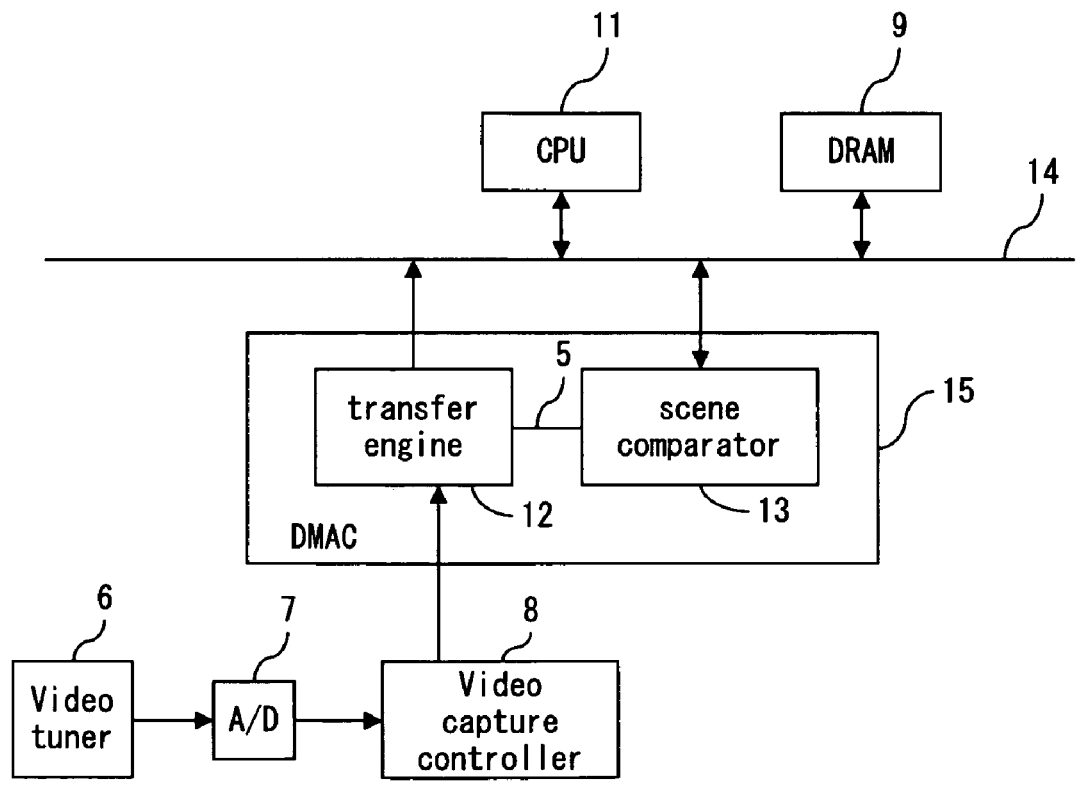
F I G. 1

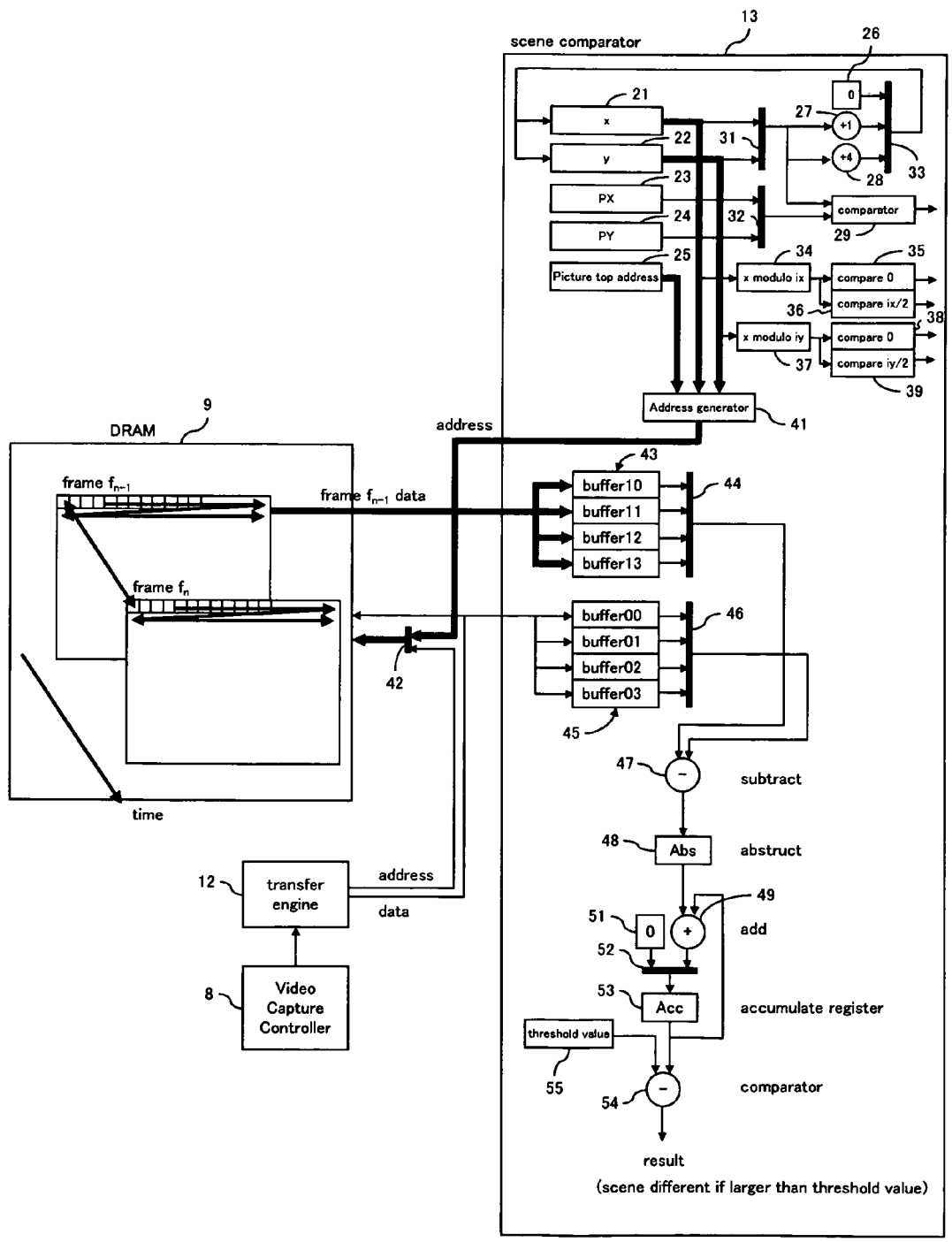
F I G. 1 1

SCENE CHANGE DETERMINATION DEVICE/METHOD AND DATA TRANSFER DEVICE/METHOD

CROSS-REFERENCE TO RELATED APPLICATIONS

This application is based upon and claiming the benefit of priority from the prior Japanese Patent Application No. 2006-040755, filed on Feb. 17, 2006, the entire contents of which are incorporated herein by reference.

BACKGROUND OF THE INVENTION

1. Field of the Invention determination device and a data transfer device having the scene The present invention relates to a scene change change determination device built-in.

2. Description of the Related Art

In order to display a dynamic image on a monitor, still images (frames) are switched, for example, several tens of times per minute. When displaying a dynamic image on a monitor, a frame quite irrelevant to the previous frame is sometimes displayed, for example, like when video recording is restarted after a temporary stoppage or when a program is switched to commercial.

If a frame composed using difference information with its previous and subsequent frames is used when displaying a quite irrelevant frame in this way, there is a problem that image quality degrades.

In order to avoid this problem, a position in which a quite irrelevant frame is displayed is detected, in other words, a scene change between frames is detected.

For example, the following patent references 1 and 2 disclose a technology for preventing mis-detection in the detection of a scene change.

Patent reference 1: Japanese Patent Application Publication No. H7-79431 "Scene Change Detection Circuit for Digital Image Signal"

Patent reference 2: Japanese Patent Application Publication No. 2000-324499 "Image Processing Device and Scene Change Detection Method"

SUMMARY OF THE INVENTION

It is an object of the present invention to provide a scene change determination device capable of efficiently determining the scene change of image data scanned by an interlace method while reducing the number of accesses to a memory area storing the image data.

It is another object of the present invention to provide a data transfer device with a scene change determination function to be able to efficiently determine the scene change of image data while reducing the number of accesses to a memory area storing the image data.

The scene change determination device in the first aspect of the present invention determines a scene change between a plurality of pieces of image data transferred by an interlace method. The scene change determination device comprises a first extraction unit for extracting a plurality of consecutive pixels used for determination from the first image data as a group, a second extraction unit for extracting pixels corresponding to the pixels extracted from the first image data, from second image data, an accumulation unit for accumulating the differences of values between the corresponding pixels extracted by the first and second extraction units and a determination unit for determining whether the accumulated value of one piece of image data exceeds a threshold value. Each of the first and second extraction units slides and extracts a plurality of pixels used for determination for each field. When the accumulated value exceeds the threshold value, the determination unit determines that a scene change is detected between corresponding pieces of image data.

In this case, since the plurality of pixels used to determine a scene change in each field of the image data transferred by an interlace method is slid and extracted, the pixels used for the determination can be distributed and extracted in the image, thereby efficiently determining a scene change. Since (the plurality of) pixels used for determination by the first and second extraction units are extracted, a scene change can be efficiently determined while reducing the number of accesses to a transfer destination memory area, for example, if the pixels are distributed and extracted in an image.

In the scene change determination device of the first aspect, the first extraction unit can also extract a plurality of pixels which continues on a line of image data being processed and whose data length is equal to or smaller than the bus width of a system bus, every time.

In this case, for example, if the number of the plurality of consecutive pixels is a little larger than required within the bus width of the system bus, the number of pixels used to determine a scene change can be increased and the accuracy of the scene change determination can be improved without increasing the load of the system.

The data transfer device in the second aspect of the present invention transfers image data to a transfer destination memory area, based on a data transfer request from a requester and determines a scene change between a plurality of pieces of transferred image data. The data transfer device comprises a transfer control unit for controlling the transfer of image data according to the data transfer request, a first extraction unit for extracting a plurality of consecutive pixels used for determination from image data being currently transferred via the transfer control unit, as a group, a second extraction unit for extracting pixels corresponding to the pixels extracted from the image data being currently transferred, from image data already transferred to the transfer destination memory area via the transfer control unit, an accumulation unit for accumulating the differences of values between the corresponding pixels extracted by the first and second extraction units and a determination unit for determining whether the accumulated value of one piece of image data exceeds a threshold value. The plurality of pixels extracted by the first extraction unit is used accumulation in the accumulation unit via a data line provided between the transfer control unit and the accumulation unit. When the accumulated value exceeds the threshold value, the determination unit determines that a scene change is detected between two pieces of corresponding image data.

In this case, a data line is provided between the transfer control unit and accumulation unit in the data transfer device, via which a plurality of pixels used for determination is transmitted to the accumulation unit. Therefore, the number of accesses to the transfer destination memory area can be reduced, compared with when the image data being currently transferred is transmitted to the accumulation unit using the system bus again after storing the data in the transfer destination memory area. Since the (plurality of consecutive) pixels used for determination by the first and second extraction units are extracted as a group, a scene change can be efficiently determined while reducing the number of accesses to a transfer destination memory area, for example, if the pixels are distributed and extracted in an image.

In the data transfer device of the second aspect, the first extraction unit can also extract a plurality of pixels which continues on a line of image data being processed and whose data length is equal to or smaller than the bus width of a system bus, every time.

In this case, for example, if the number of the plurality of consecutive pixels is a little larger than required within the bus width of the system bus, the number of pixels used to determine a scene change can be increased and the accuracy of the scene change determination can be improved without increasing the load of the system.

According to the present invention, a scene change can be efficiently determined in image data transferred by an interlace method while reducing the number of accesses to a memory area storing the image data.

According to the present invention, the number of accesses to a transfer destination memory area can be reduced by transmitting a plurality of pixels used for determination from a transfer control unit to an accumulation unit in the data transfer device via a data line provided between the transfer control unit and the accumulation unit.

According to the present invention, if the number of a plurality of consecutive pixels used for determination is a little larger than required within the bus width of the system bus, the accuracy of the scene change determination can be improved without increasing the load of the system.

BRIEF DESCRIPTION OF THE DRAWINGS

FIG. 1 shows the entire configuration of a system comprising a DMA controller including the scene comparator in one preferred embodiment of the present invention;

FIG. 11 emphasizes units related to the process in step S205 shown in FIG. 9, in FIG. 7;

DESCRIPTION OF THE PREFERRED EMBODIMENTS

Figure 2:
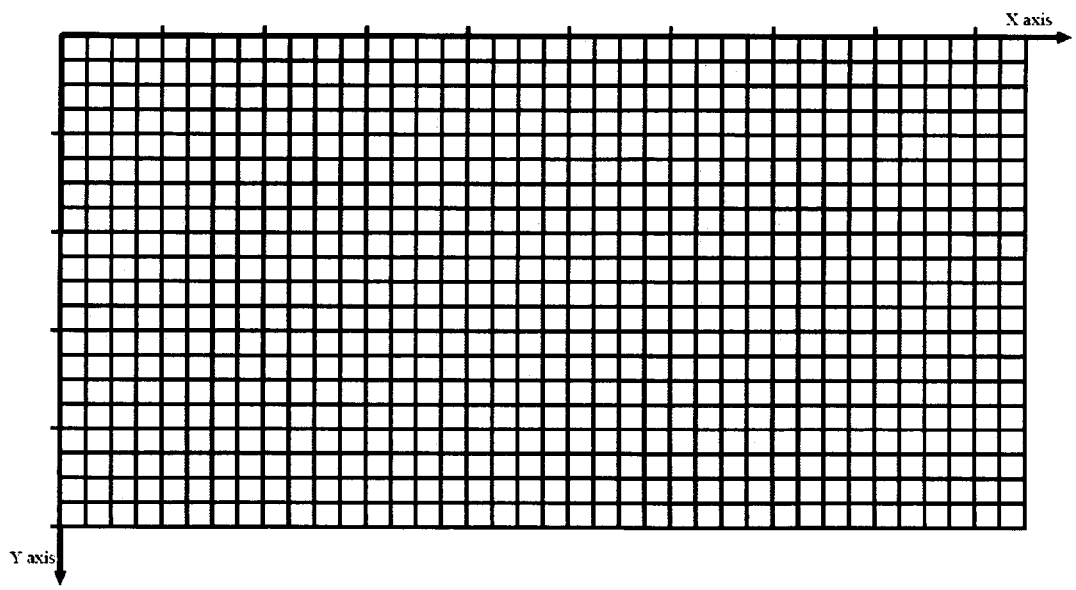
FIG. 2 shows pixels used to determine a scene change in image data.

The present invention utilizes Japanese Patent Application Publication No. 2004-368967.

FIG. 1 shows the entire configuration of a system comprising a DMA controller including the scene comparator in one preferred embodiment of the present invention.

In FIG. 1, a video tuner 6 selects a broadcast wave and converts it into a video signal. An A/D converter 7 converts an analog video signal into digital image data and outputs it to a video capture controller 8.

The video capture controller 8 eliminates end parts not displayed on a monitor from the image data outputted by the A/D converter 7. The video capture controller 8 outputs an instruction to transfer the image data whose end parts are eliminated to a dynamic random-access memory (DRAM) 9 (data transfer request), to a direct memory access controller (DMAC) 15. Although in FIG. 1 the DRAM 9 is used as the transfer destination memory area of the image data, besides this, synchronous DRAM (SDRAM), static random-access memory (SRAM) or the like can also be used as the transfer destination memory area.

If this data transfer request is set in the setting register, which is not shown in FIG. 1, of the DMAC 15, the DMA transfer process of image data from the video capture controller 8 to the DRAM 9 is started.

As shown in FIG. 1, the DMAC 15, a central processing unit (CPU) 11, the DRAM 9 are connected via a system bus 14. The DMAC 15 comprises a transfer engine 12 for controlling a transfer of a plurality of pieces of image data, and a scene comparator 13 for determining a scene change between a plurality of pieces of image data. This is because of performing a scene change determination process by the scene comparator 13 in parallel with DMA transfer. The transfer engine 12 and scene comparator 13 in the DMAC 15 are connected by a data line (dedicated line) 5 different from the system bus 14.

Image data to be DMA-transferred is stored in the DRAM 9 via the transfer engine 12. In this case, pixels used to determine the scene change of image data being currently transferred are outputted from the transfer engine 12 to the scene comparator 13 via the dedicated line 5.

In this preferred embodiment, a scene change is determined by evaluating a difference value in corresponding pixels between the current image data and its immediately previous image data. Therefore, the pixels of the immediately previous image data corresponding to pixels in the scene comparator 13 via the dedicated line 5 are obtained in the scene comparator 13 from the DRAM 9 via the system bus 14.

In FIG. 1, the CPU 11 monitors the respective results of the elimination process of end parts from image data, of the video capture controller 8, the DMA transfer process by the transfer engine 12 of the DMAC 15 and the scene change determination process by the scene comparator 13 of the DMAC 15.

FIG. 2 shows pixels used to determine a scene change in image data.

As shown in FIG. 2, a group of pixels used for determination (also called a "pattern used for determination") are extracted from a line at intervals of a predetermined number of lines (four lines in FIG. 2) in image data. Then, in one line, a plurality of consecutive pixels (four pixels in FIG. 2) whose data length is equal to or smaller than the bus width of the system bus is extracted as a group and at intervals of a predetermined number of pixels (16 pixels in FIG. 2) every time.

In this preferred embodiment, it is assumed that one pixel is one byte and the bus width of each of the system bus 14 and the dedicated line 5 is four bytes. Specifically, four bytes (four pixels) of data are transmitted to the system bus 14 or the dedicated line 5 in a timing data is transferred (by a valid signal).

Figure 3:
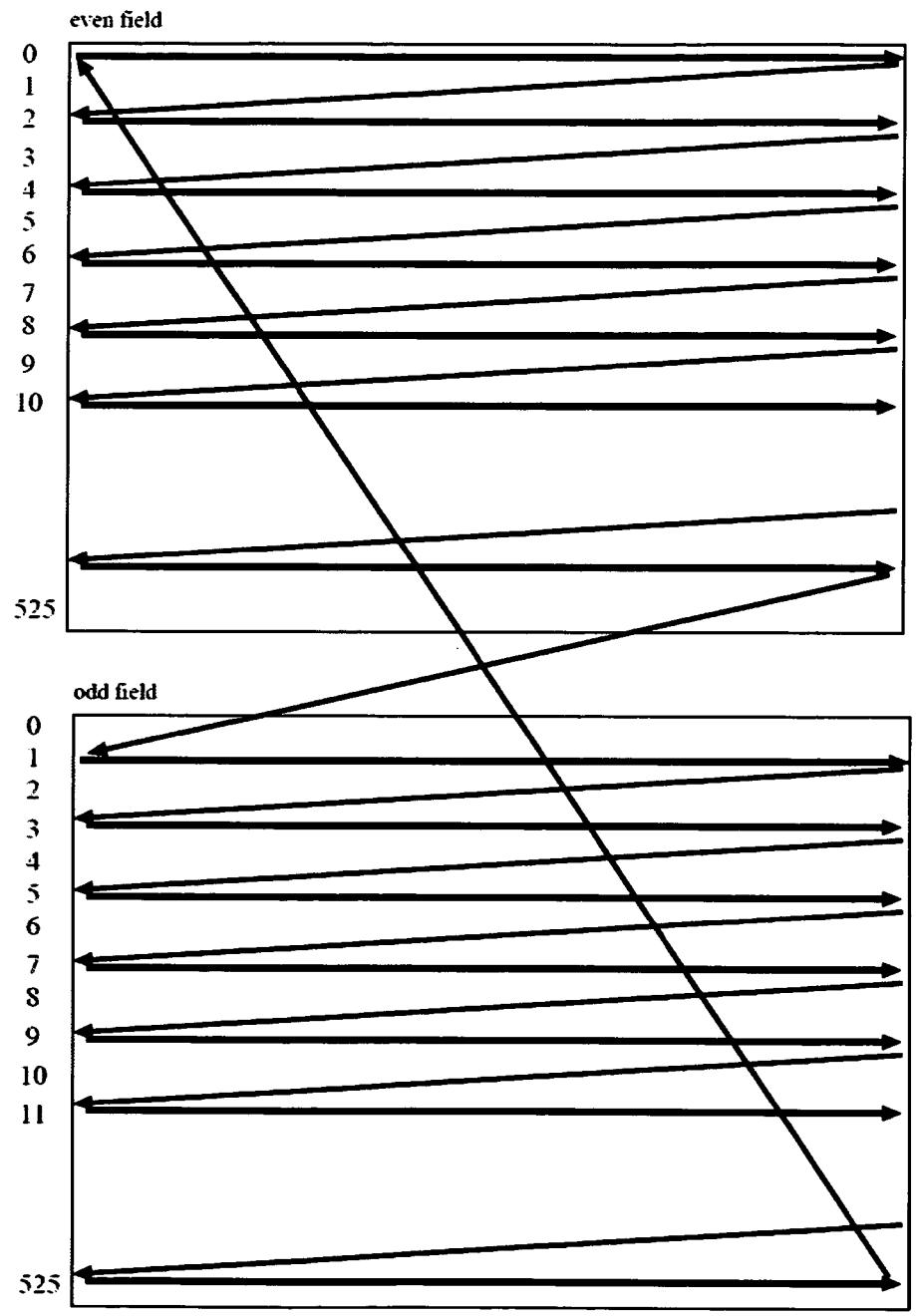
FIG. 3 explains an interlace method.

As the scanning method of image data, there is an interlace method of scanning the even and odd fields of image data, as shown in FIG. 3. In FIG. 3, one piece of image data is composed of "720" pixels×"526" lines.

It is assumed that a scene change is determined applying the pattern shown in FIG. 2 to image data scanned by the interlace method.

If the pattern shown in FIG. 2 is applied without any modifications, a pattern used for determination is extracted only from even fields, which is not preferable in the viewpoint of scene change accuracy.

Figure 4:
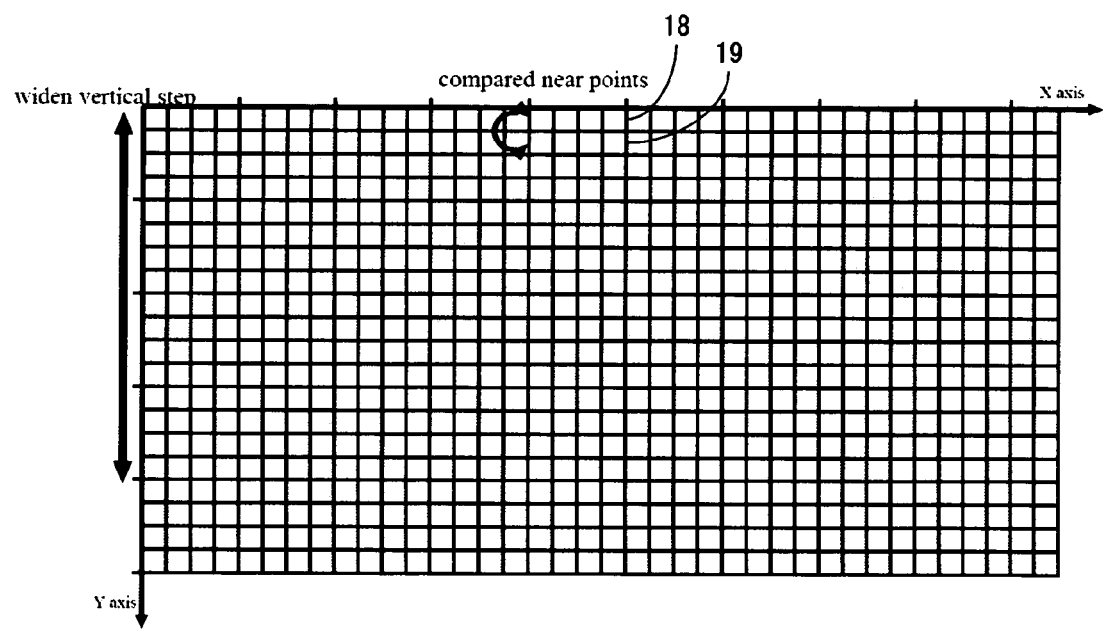
FIG. 4 explains a problem which occurs when the pattern shown in FIG. 2 is applied to the interlace method.

However, if a pattern used for determination is extracted by applying the same logic to the even and odd fields, as shown in FIG. 4, there is a problem that since a pattern used for determination in an even field and a pattern used for determination in an odd field adjoin each other and patterns are not sufficiently distributed in image data, a scene change cannot be efficiently determined. In FIG. 4, reference numbers 18 and 19 indicate a pattern used for determination in an even field and a pattern used for determination an odd field, respectively.

Figure 5:
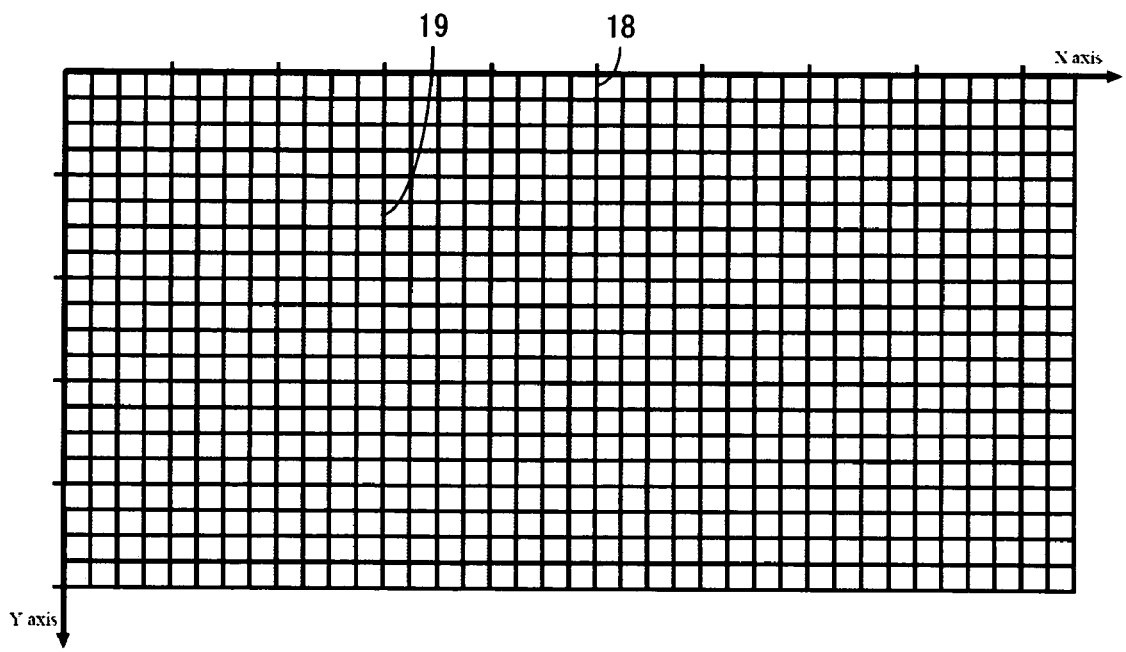
FIG. 5 shows a pattern which is applied to image data scanned by the interlace method in the preferred embodiment.

Therefore, in this preferred embodiment, as shown in FIG. 5, a pattern 18 used for determination in an even field and a pattern 19 used for determination an odd field are appropriately distributed in image data.

Figure 6A:
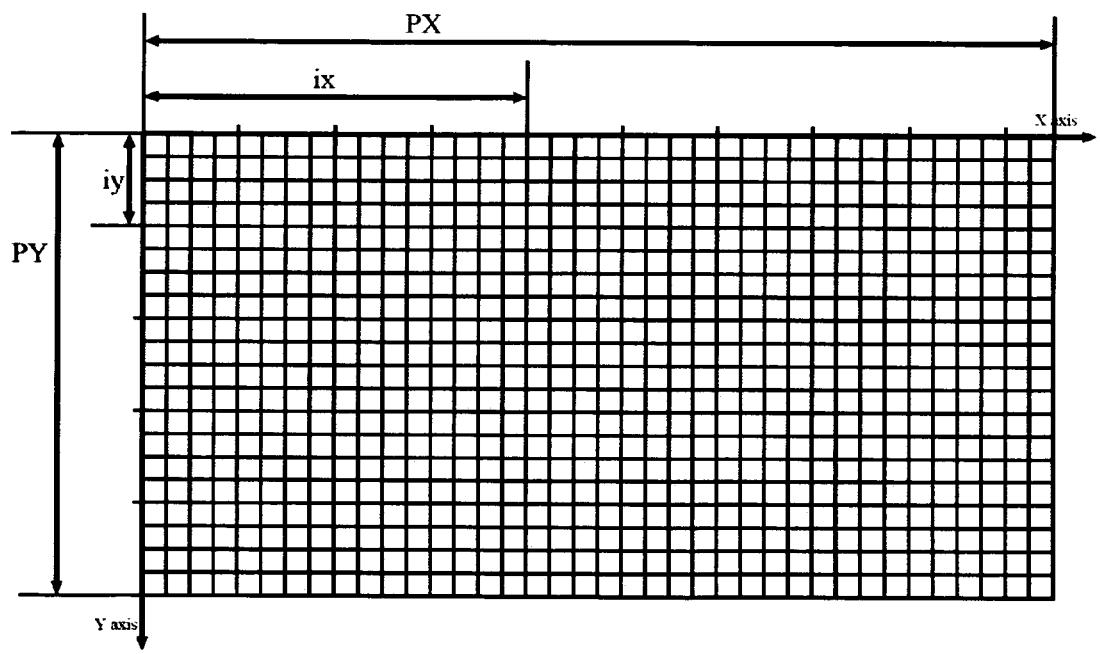
FIG. 6A shows only even fields of the image data shown in FIG. 5 together with a pattern extracted from the even fields.
Figure 6B:
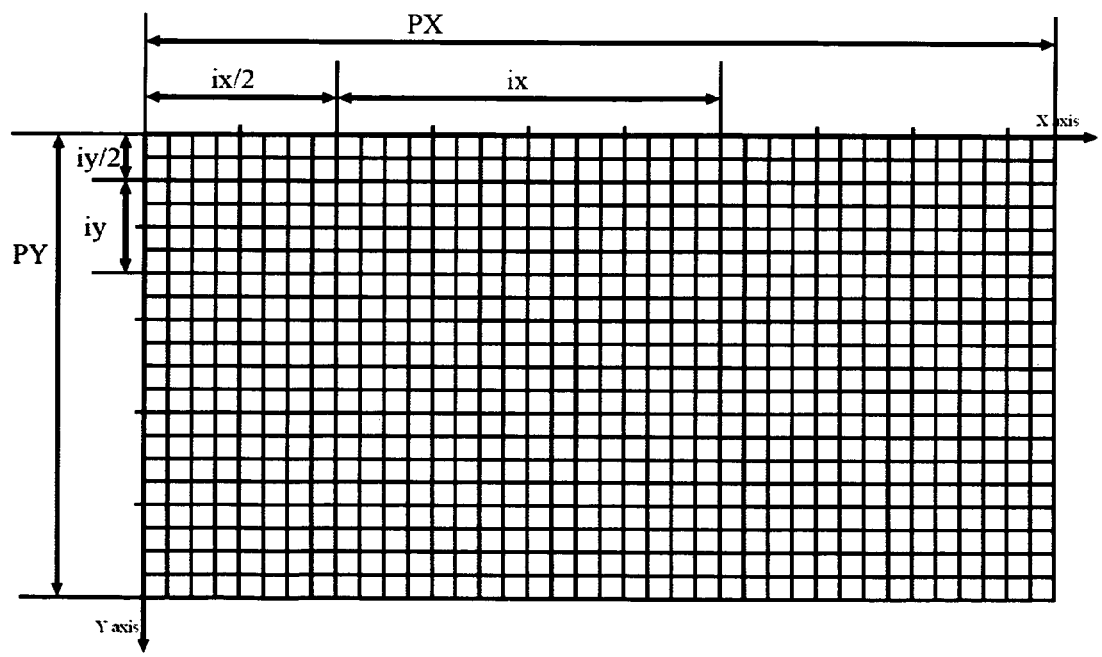
FIG. 6B shows only odd fields of the image data shown in FIG. 5 together with a pattern extracted from the odd fields.

FIG. 6A shows only even fields of the image data shown in FIG. 5 together with a pattern extracted from the even fields and FIG. 6B shows only odd fields of the image data shown in FIG. 5 together with a pattern extracted from the odd fields.

In FIGS. 6A and 6B, ix, iy, PX and PY indicate an interval at which a plurality of consecutive pixels (group of pixels; also called a "pattern") is extracted in one line, a line interval at which a group of pixels used for determination are extracted, the number of pixels per line and the number of lines of an even or odd field, respectively. If the image data shown in FIG. 5 has the same size as the image data shown in FIG. 3, the image data shown in FIG. 3 has 526 lines. Therefore, each field shown in FIG. 6A or 6B has 263 lines. In other words, PY=263.

ix/2 and iy/2 shown in FIG. 6B are offset values used to slide the position of a group of pixels used for determination in even or odd fields, respectively.

Figure 7:
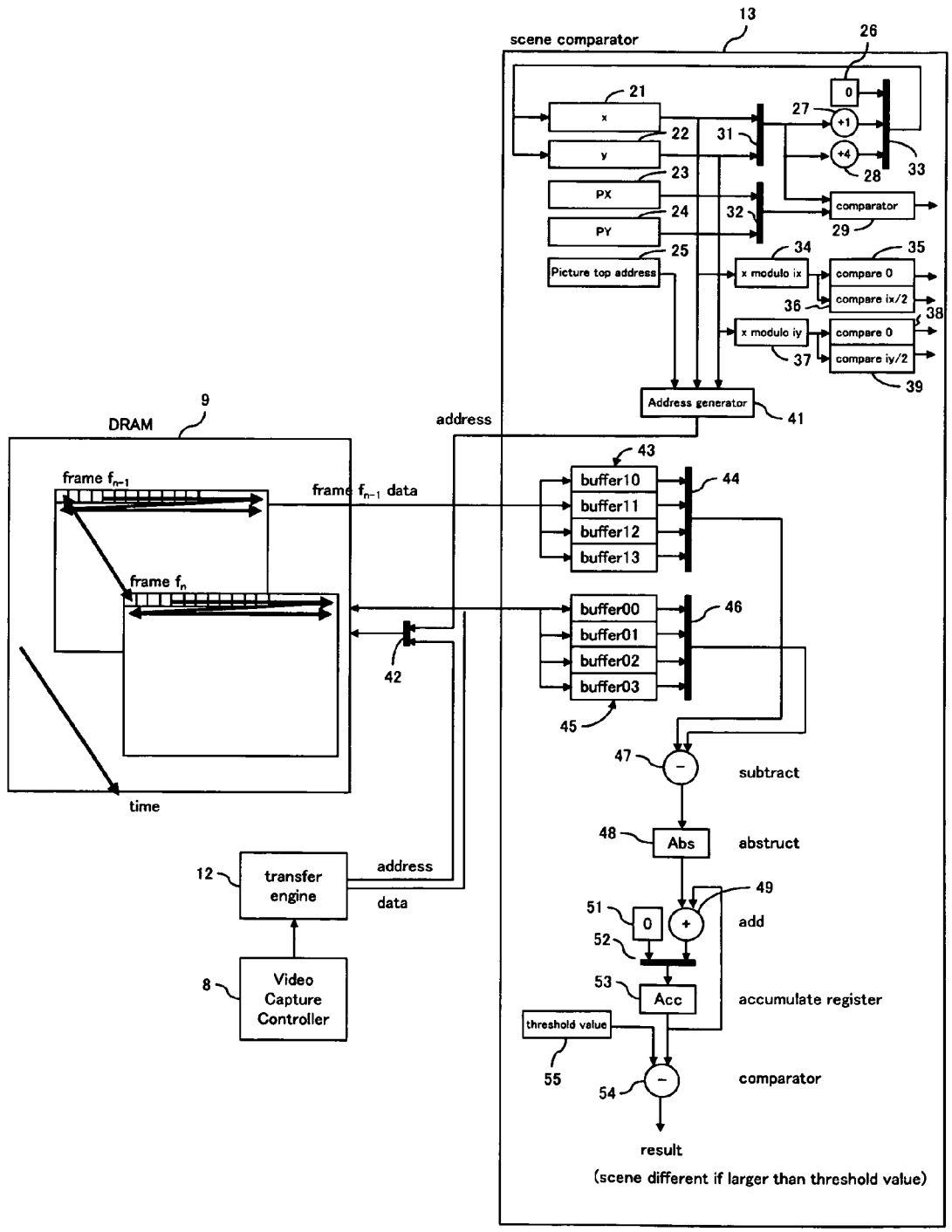
FIG. 7 shows the more-detailed configuration of the major units shown in FIG. 1.

FIG. 7 shows the more-detailed configuration of the major units shown in FIG. 1.

Figure 8:
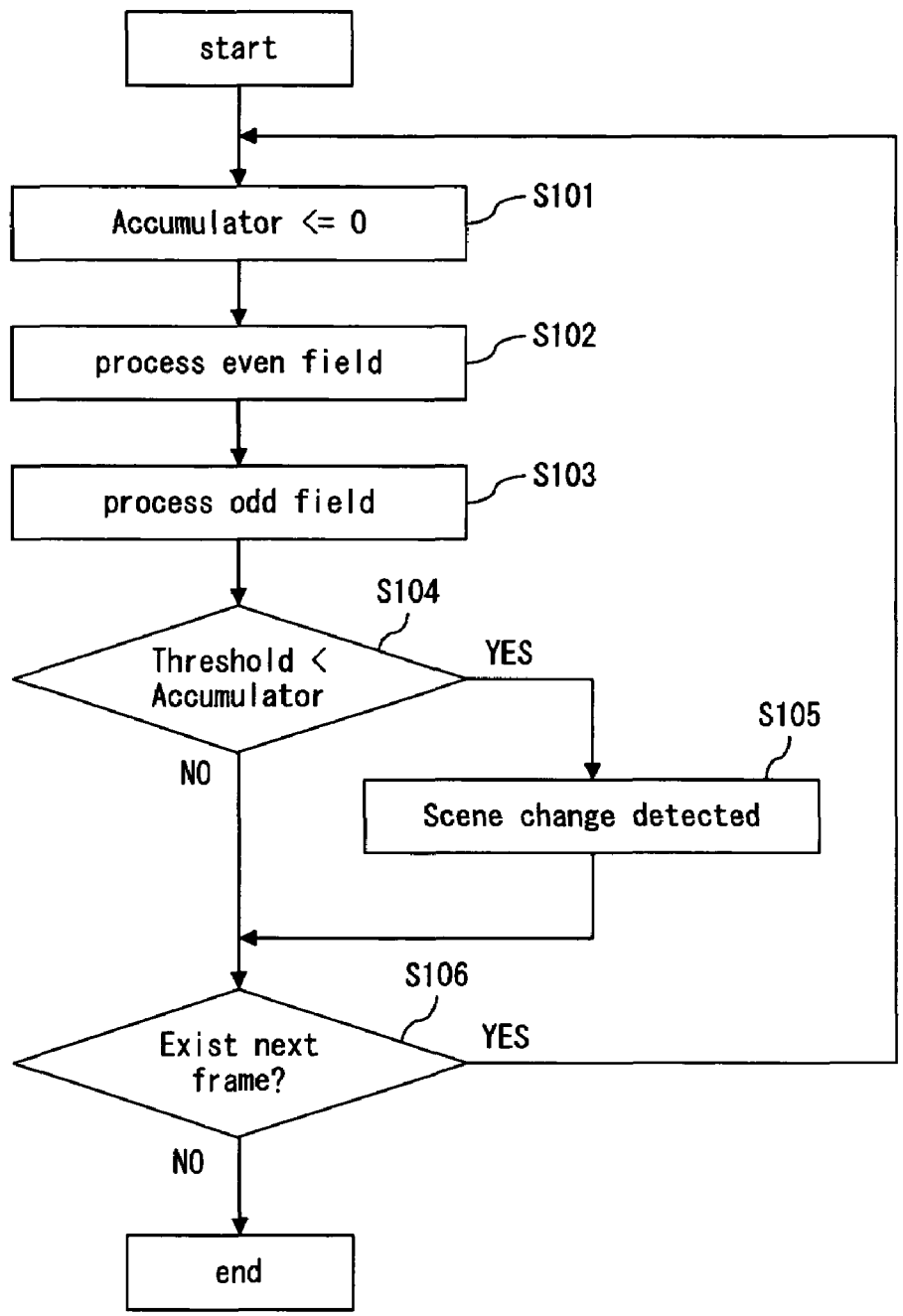
FIG. 8 is the entire flowchart of the scene change determination process.

FIG. 8 is the entire flowchart of the scene change determination process which is activated in response to a data transfer request received by the DMAC 15. This flowchart is executed by the scene comparator 13 and the CPU 11.

In FIG. 8, a series of processes are activated using the fact that a DMA transfer instruction is inputted from a requester (video capture controller 8) to the DMAC 15 and DMA transfer is started as a trigger.

Firstly, in step S101, if a constant "0" stored in the data storage unit 51 shown in FIG. 7 is written from the data storage unit 51 into an accumulate register 53 via a selector 52, the accumulate register 53 is initialized.

Then, in step S102, the even field of image data scanned by an interlace method is processed. After the all the lines of the even field are processed, in step S103 the odd field of image data scanned by an interlace method is processed.

In step S104, as the result of a process for one piece of image data, an accumulated value stored in the accumulate register 53 is compared with a threshold value stored in the data storage unit 55. If it is determined that this accumulated value is larger than the threshold value, in step S105 it is determined that a scene change is detected and a flag for indicating the determination result is set in predetermined dedicated registers, which are not shown in FIG. 7, of the DMAC 15.

In this preferred embodiment, a DMA transfer process is performed by the transfer engine 12 in parallel with the scene change determination process. As to the image data DMA-transferred this time, flag information indicating the transfer result is set in a predetermined dedicated register, which is not shown in FIG. 7, in the DMAC 15. The flag information set in these dedicated registers is referenced by the CPU 11.

When in step S104 it is determined that the accumulated value is equal to or smaller than the threshold value or after the process in step S105 is performed, the flow proceeds to step S106.

In step S106, the CPU 11 determines whether the DMA transfer instruction includes subsequent image data. If it is determined that the DMA transfer instruction includes subsequent image data, in words other if subsequent image data (frame) exists, the DMA transfer processing of the subsequent image data is started by the instruction of the CPU 11. In this case, the flow returns to step S101.

If in step S106 the CPU 11 determines that the DMA transfer instruction includes no subsequent image data, the series of processes are terminated.

Next, the process in step S102 shown in FIG. 8, specifically the process of extracting pixels used for determination from the respective even fields of the current image data and its immediately previous image data and accumulating the differences of values between the extracted pixels is described with reference to FIG. 9.

Firstly, in step S201, the constant "0" stored in a data storage unit 26 is outputted from the data storage unit 26 to data storage units 21 and 22 via a selector 33. The data storage unit 21 stores a variable x indicating a pixel position from the top of each line of image data, and the data storage unit 22 stores a variable y indicating the number of lines in the current field of image data. In other words, in step S201, the pixel position and the number of lines are initialized.

In step S202, the variable x read from the data storage unit 21 is outputted to a modulo calculation unit 34. The modulo calculation unit 34 calculates a modulo by dividing the interval ix at which a plurality of pixels used for determination forming one group is extracted in a line by the current pixel position x and outputs it to a comparator 35 at a subsequent stage. The comparator 35 determines whether the output of the modulo calculation unit 34 is equals to "0" and outputs a signal indicating the determination result. Specifically, if the comparator 35 determines that the modulo is not equal to "0", the flow proceeds to step S213.

If the comparator 35 determines that the modulo is equal to "0", the flow proceeds to step S203.

In step S203, the variable y read from the data storage unit 22 is outputted to a modulo calculation unit 37. The modulo calculation unit 37 calculates a modulo by dividing the interval iy for determining at intervals of how many lines to extract pixels used for determination by the current number of lines y and outputs it to a subsequent comparator 38. The comparator 38 determines whether the output of the modulo calculation unit 37 is equal to "0" and outputs a signal indicating the determination result. Specifically, if the comparator 38 determines that the modulo is not equal to "0", the flow proceeds to step S213.

If the comparator 38 determines that the modulo is equal to "0", the flow proceeds to step S204.

The fact that control proceeds to step S204 means that each of the comparator 35 in step S202 and the comparator 38 in step S203 outputs a signal indicating that the modulo is "0", specifically that a pixel position used for determination is reached.

The signal indicating that a pixel position used for this determination is reached (AND of the respective outputs of the comparators 35 and 38) is inputted to an access control unit for controlling an access to a buffer unit 45 composed of buffers 00, 01, 02 and 03, which is not shown in FIG. 7, and a buffer access control unit for controlling the access to a buffer unit 43 composed of buffers 10, 11, 12 and 13, which is not shown in FIG. 7. The access control unit of either the buffer unit 43 or 45 permits writing into each buffer, based on this signal.

Figure 10:
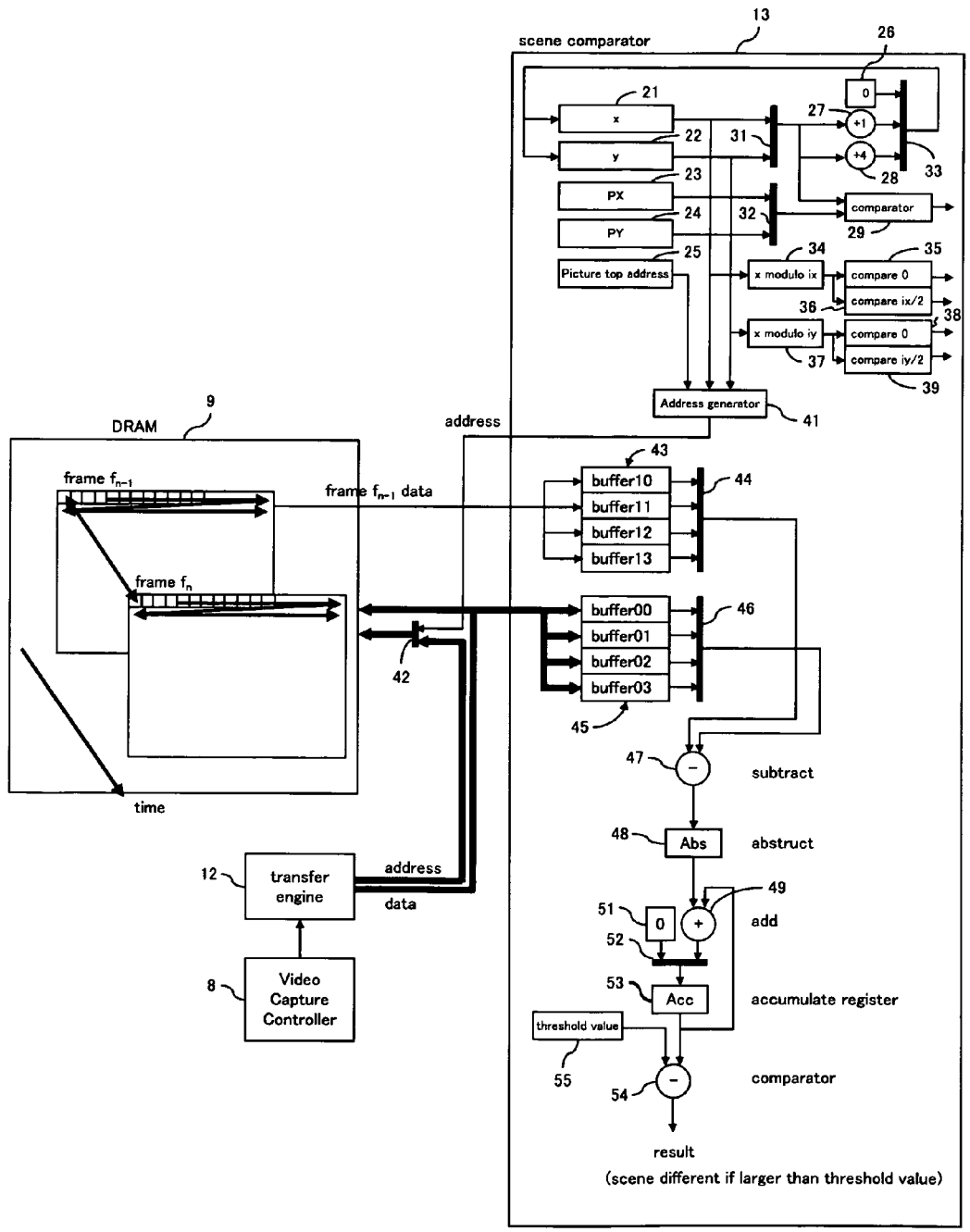
FIG. 10 emphasizes units related to the process in step S204 shown in FIG. 9, in FIG. 7.

In step S204, as shown in FIG. 10, a selector 42 selects a control signal from the transfer engine 12 and outputs it to the DRAM 9. Specifically, data for four bytes (four pixels) is written after the address of the DRAM 9 included this control signal.

Since a dedicated line is provided between the transfer engine 12 and scene comparator 13, the same data for four pixels reaches the buffer unit 45 (buffers 00, 01, 02 and 03) of the scene comparator 13 via the dedicated line. However, in this case, since the access control unit permits writing into the buffer unit 45 as described above, the data for four pixels is stored in the buffer unit 45.

Each buffer constituting the buffer unit 45 can store data for one pixel. In this case, in the buffers 00, 01, 02 and 03, the brightness value of the top pixel of the four pixels (brightness value in the x-th position of the y-th line of the n-th image data), the brightness value of the second pixel of the four pixels (brightness value in the (x+1)th position of the y-th line of the n-th image data), the brightness value of the third pixel of the four pixels (brightness value in a the (x+2)-th position of the y-th line of the n-th image data) and the brightness value of the fourth pixel of the four pixels (brightness value in a the (x+3)-th position of the y-th line of the n-th image data), respectively, are stored. The selector 42 is apart of an arbiter circuit for performing arbiter process in order to avoid the conflict of the system bus 14.

Then, in step S205, as shown in FIG. 11, the selector 42 selects a control signal generated by an address generator 41 and outputs it to the DRAM 9. Specifically, data for four bytes (four pixels) after the address of the immediately previous image data included in this control signal is read from the DRAM 9 in the buffer unit 43 (buffers 10, 11, 12 and 13) of the scene comparator 13 via the system bus 14.

Each buffer constituting the buffer unit 43 can store data for one pixel. In this case, in the buffers 10, 11, 12 and 13, the brightness value of the top pixel of the four pixels (brightness value of a pixel in the x-th position of the y-th line of the (n−1)th image data), the brightness value of the second pixel of the four pixels (brightness value of a pixel in the (x+1)th position of the y-th line of the (n−1)th image data), the brightness value of the third pixel of the four pixels (brightness value of a pixel in the (x+2) th position of the y-th line of the (n−1) th image data) and the brightness value of the fourth pixel of the four pixels (brightness value of a pixel in the (x+3)th position of the y-th line of the (n−1)th image data), respectively, are stored.

The data storage unit 25 stores the top address (absolute value) of the latest (immediately previous) image data already written in the DRAM 9. The address generator 41 generates the starting address of the four pixels of immediately previous image data corresponding to the four pixels of the current image data read in the buffer unit 45, based on the top address of the immediately previous image data, the current pixel position (relative value) stored in the data storage unit 21, and the current line position (relative value) stored in the data storage unit 22.

Figure 12:
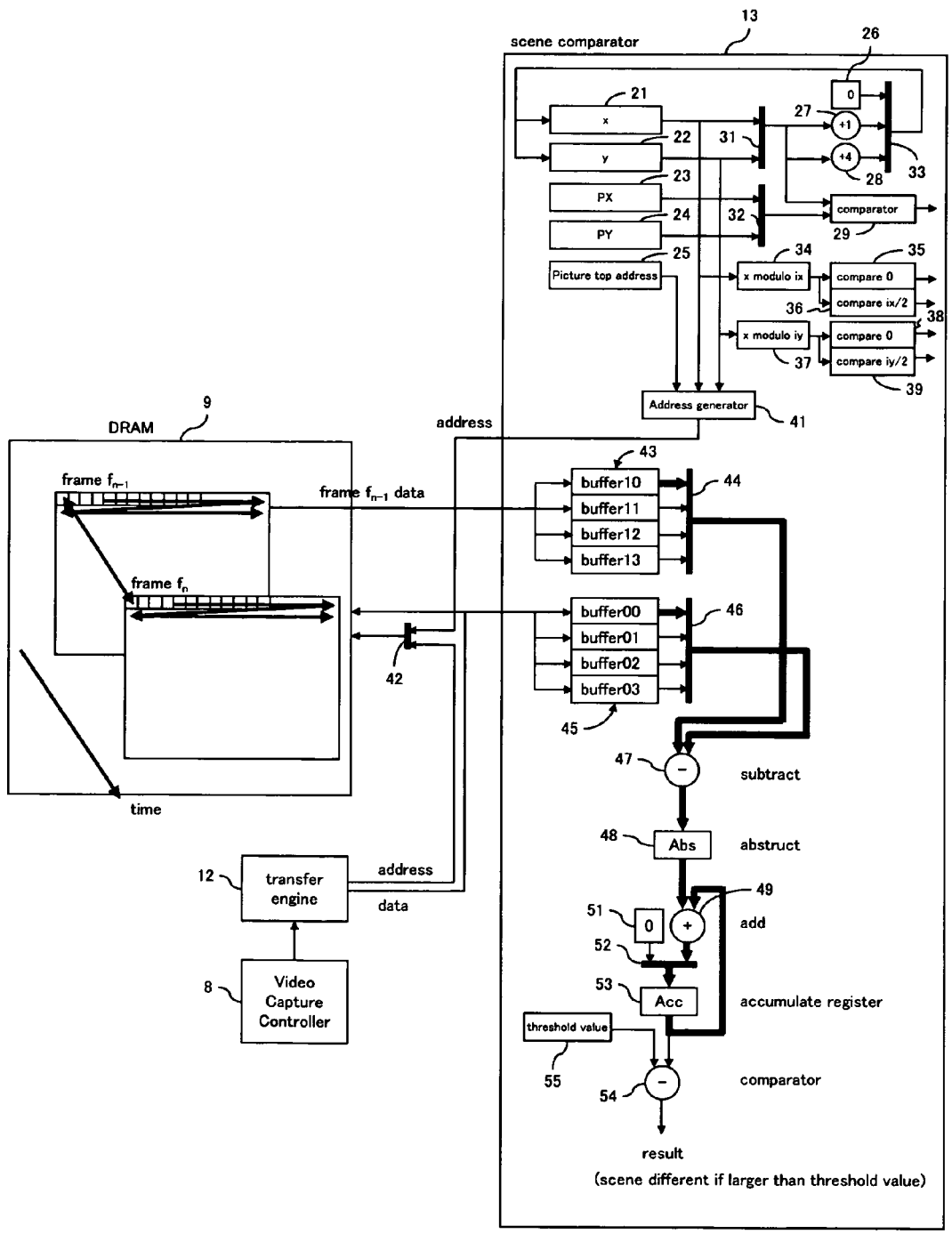
FIG. 12 emphasizes units related to the process in step S206 shown in FIG. 9, in FIG. 7.

Then, in step S206, as shown in FIG. 12, the difference in brightness value between the buffers 00 and 10 is further added to the accumulated value in the accumulate register 53.

Figure 9:
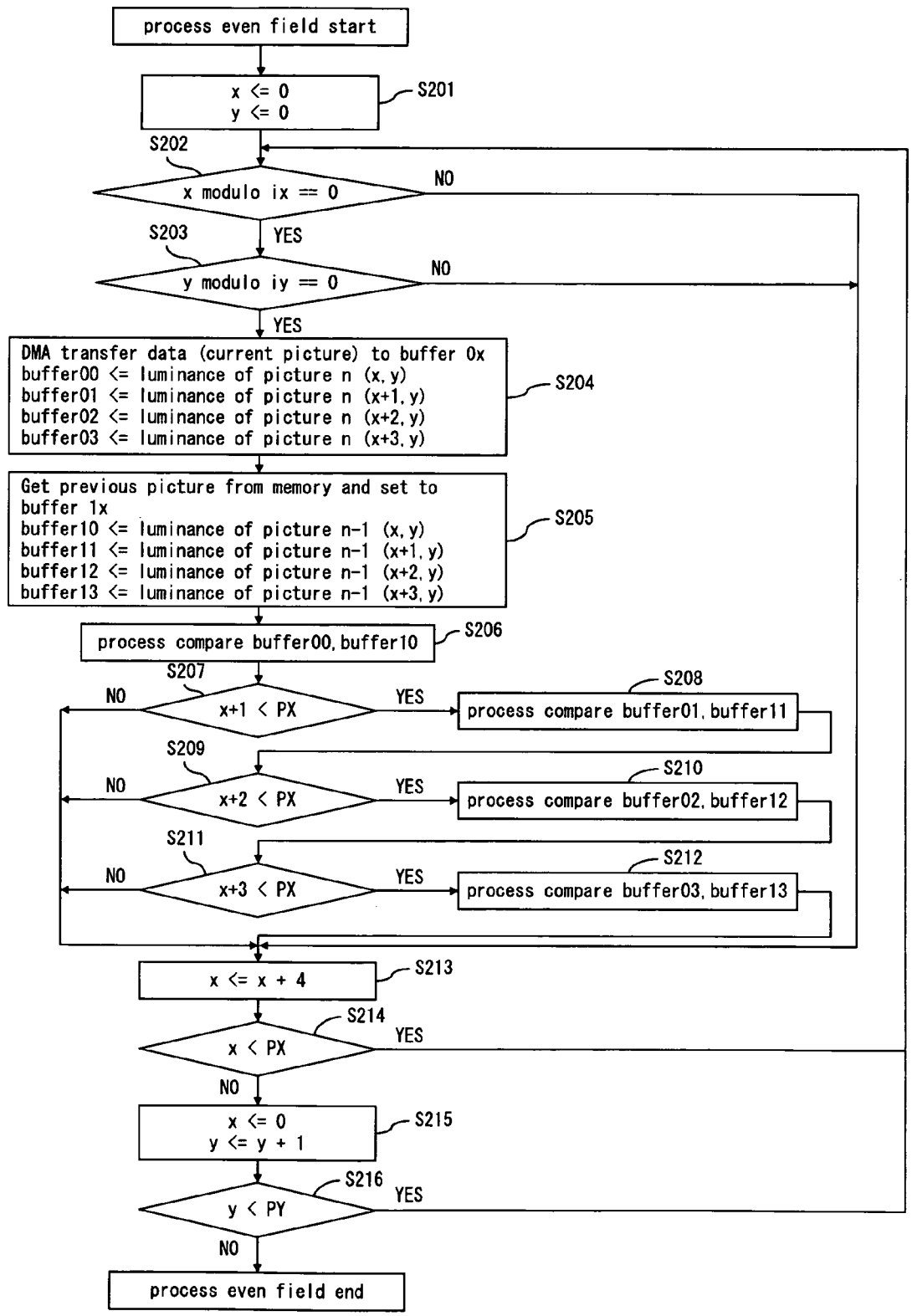
FIG. 9 is the flowchart of the process of extracting pixels used for determination from the even fields of the current image data and its immediately previous image data and accumulating the differences of values between the extracted pixels.
Figure 13:
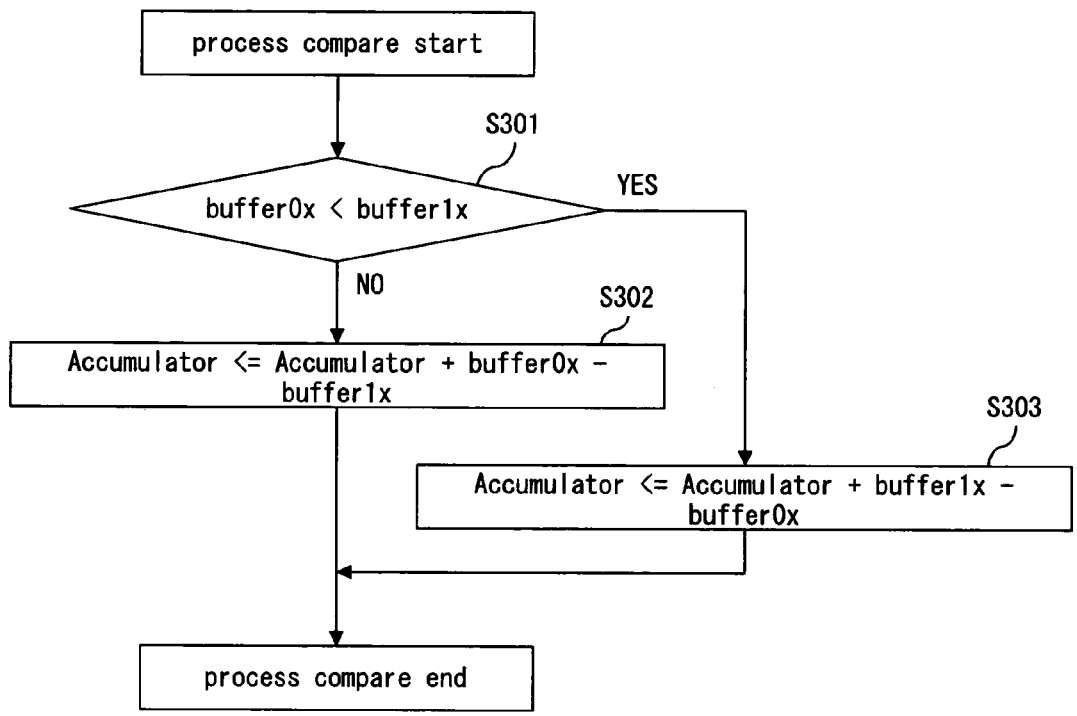
FIG. 13 is a flowchart showing the detailed process in step S206 and the like in FIG. 9.

FIG. 13 is a flowchart showing the detailed process in step S206 and the like in FIG. 9.

The flowchart shown in FIG. 13 also shows the more-detailed processes in steps S208, S210 and S212 besides that in step S206. By assigning "0" through "3" to the "x" of buffers 0x and 1x, in accordance with each step, a process corresponding to each step can be obtained. The following description is made on step S206.

In step S13, firstly, in step S301, it is determined whether the brightness value stored in the buffer 00 is smaller than the brightness value stored in the buffer 10. If in step S301 it is determined that the brightness value stored in the buffer 00 is equal to or larger than the brightness value stored in the buffer 10, in step S302 an adder 49 further adds (the brightness value of the buffer 00−the brightness value of the buffer 10) to the accumulated value set in the accumulate register 53. If in step S301 it is determined that the brightness value stored in the buffer 00 is smaller than the brightness value stored in the buffer 10, in step S303 the adder 49 adds (the brightness value of the buffer 10−the brightness value of the buffer 00) to the accumulated value set in the accumulate register 53.

The description returns to the flowchart shown in FIG. 9 again.

Then, in step S207, the current pixel position x stored in the data storage unit 21 and the number of pixels PX per line stored in the data storage unit 23 are outputted to a comparator 29 via selectors 31 and 32, respectively. Then, the comparator 29 determines whether (x+1) is smaller than PX.

If in step S207 it is determined that (x+1) is equal to or larger than PX, the (x+1) th pixel does not exist in the current line. Therefore, the difference in brightness value between buffers 01 and 11 is not added to the accumulated value and the flow proceeds to step S213.

If in step S207 it is determined that (x+1) is smaller than PX, in step S208 the difference in brightness value between buffers 01 and 11 is further added to the accumulated value stored in the accumulate register 53. Then, the flow proceeds to step S209.

In step S209, the current pixel position x stored in the data storage unit 21 and the number of pixels PX per line stored in the data storage unit 23 are outputted to the comparator 29 via the selectors 31 and 32, respectively. Then, the comparator 29 determines whether (x+2) is smaller than PX.

If in step S209 it is determined that (x+2) is equal to or larger than PX, the (x+2) th pixel does not exist in the current line. Therefore, the difference in brightness value between the buffers 02 and 12 is not further added to the accumulated value and the flow proceeds to step S213.

If in step S209 it is determined that (x+2) is smaller than PX, in step S210 the difference in brightness value between the buffers 02 and 12 is further added to the accumulated value stored in the accumulate register 53. Then, the flow proceeds to step S211.

In step S211, the current pixel position x stored in the data storage unit 21 and the number of pixels PX per line stored in the data storage unit 23 are outputted to the comparator 29 via the selectors 31 and 32, respectively. Then, the comparator 29 determines whether (x+3) is smaller than PX.

If in step S211 it is determined that (x+3) is equal to or larger than PX, the (x+3)th pixel does not exist in the current line. Therefore, the difference in brightness value between the buffers 03 and 13 is not further added to the accumulated value and the flow proceeds to step S213.

If in step S211 it is determined that (x+3) is smaller than PX, in step S212 the difference in brightness value between the buffers 03 and 13 is further added to the accumulated value stored in the accumulate register 53. Then, the flow proceeds to step S213.

In step S213, the pixel position x stored in the data storage unit 21 is outputted to an increment processing unit 28 via the selector 31, the value is added by "+4" and is stored in the data storage unit 21 again. Specifically, the current pixel position is updated to subsequent four pixels of the line by this process.

Then, in step S214, the current (updated) pixel position x stored in the data storage unit 21 and the number of pixels per line PX stored in the data storage unit 23 are outputted to the comparator 29 via the selectors 31 and 32, respectively. Then, the comparator 29 determines whether the pixel position x is smaller than the number of pixels PX per line.

If in step S214 it is determined that the position x is smaller than the number of pixels PX per line, the flow returns to step S202. Unless the updated pixel position x meets the conditions of both steps S202 and S203, control transits from step S202 or 203 to step S213, and the current pixel position x is updated to subsequent four pixels in the line.

If in step S214 it is determined that the position x is equal to or larger than the number of pixels PX per line, in step S215 the pixel position x is initialized by outputting the constant "0" stored in the data storage unit 26 to the data storage unit 21 via the selector 33.

If the number of lines in the current field stored in the data storage unit 22 is outputted to an increment processing unit 27 via the selector 31, the value is added by "+1" and is stored in the data storage unit 22 again. Specifically, the current pixel position is updated to the top of a subsequent line by this process.

In step S216, the current number of lines y stored in the data storage unit 22 and the number of lines of each (current) field PY stored in the data storage unit 24 are outputted to the comparator 29 via the selectors 31 and 32, respectively. Then, the comparator 29 determines whether the current number of lines y is smaller than the number of lines of the current field PY.

If in step S216 it is determined that the current number of lines y is smaller than the number of lines the current field PY, the flow returns to step S202.

If in step S216 it is determined that the current number of lines y is equal to or larger than the number of lines the current field PY, the process of the current field (even field in this case) is terminated.

When the process of an even field is terminated, the process of an odd field is started. Next, the process in step S103 shown in FIG. 8, specifically the process of extracting pixels used for determination from the respective odd fields of the current image data and its immediately previous image data and accumulating the differences in (brightness) value between the extracted pixels is described with reference to FIG. 14.

Figure 14:
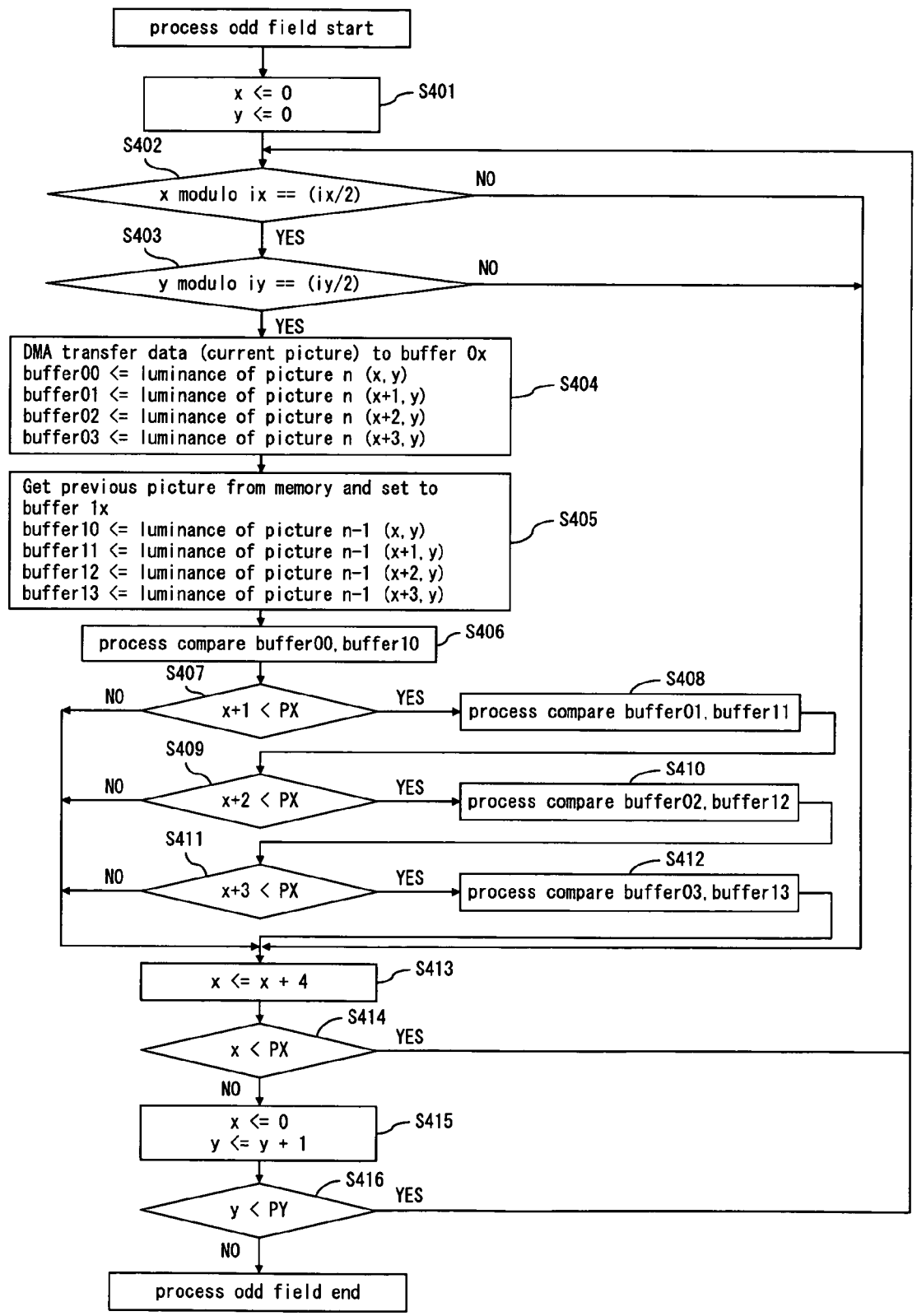
FIG. 14 is the flowchart of the process of extracting pixels used for determination from the odd fields of the current image data and its immediately previous image data and accumulating the differences of values between the extracted pixels.

Although each step number (S4XX) shown in FIG. 14 corresponds to each step number (S2XX) shown in FIG. 9, except steps 402 and 403, its operation is the same as in the even field shown in FIG. 9. Therefore, the processes in only steps S402 and S403 are described here.

As shown in FIG. 5, in this preferred embodiment, a pattern 18 used for determination in an even field and a pattern 19 used for determination in an odd field are appropriately distributed and disposed in image data in order to efficiently determine a scene change. In order to realize this disposition, for example, an offset value (for pixel position and the number of lines) is used only for an odd field and only when the modulo calculation result coincides with the offset value, a pixel is extracted.

Specifically, instead of the comparators 35 and 38 used in an even field, a comparator 36 for comparing an offset value ix/2 for determining a pixel position with the modulo calculation result of the pixel position and a comparator 39 for comparing an offset value iy/2 for determining the number of lines with the modulo calculation result of the number of lines are used in an odd field. The processes in steps 402 and 403 are described below.

In step S402, the variable x read from the data storage unit 21 is outputted to the modulo calculation unit 34. The modulo calculation unit 34 calculates a modulo by dividing the interval ix at which a plurality of pixels used for determination, being a group, are extracted in the line by the current pixel position x and outputs it to the comparator 36 at a subsequent stage. The comparator 36 determines whether the output of the modulo calculation unit 34 is equal to an offset value "ix/2", and outputs a signal indicating the determination result. Specifically, if the comparator 36 determines that the modulo is not equal to "ix/2", the flow proceeds to step S413.

If the comparator 36 determines that the modulo is equal to "ix/2", the flow proceeds to step S403.

In step S403, the variable y read from the data storage unit 22 is outputted to the modulo calculation unit 37. The modulo calculation unit 37 calculates a modulo by dividing the interval iy at intervals of how many lines to extract pixels used for determination by the current number of lines y and outputs it to the comparator 39 at a subsequent stage. The comparator 39 determines whether the output of the modulo calculation unit 37 is equal to an offset value "iy/2" and outputs a signal indicating the determination result. Specifically, if the comparator 39 determines that the modulo is not equal to "iy/2", the flow proceeds to step S413.

If the comparator 39 determines that the modulo is equal to "iy/2", the flow proceeds to step S404.

Since a dedicated line 5 is provided between the transfer engine 12 and scene comparator 13 in the DMA controller 15 of this preferred embodiment, pixels used to determine the scene change of image data being currently transferred can be transmitted to the scene comparator .13 side via the dedicated line 5.

Therefore, even when the interlace method is not used, in the method of this preferred embodiment, the number of accesses to the DRAM 9 can be reduced compared with when transmitting the image data being currently transferred, to the scene comparator 13 using the system bus again after storing it in the DRAM 9.

What is claimed is:

1. A scene change determination device for determining a scene change between a plurality of pieces of image data transferred by an interlace method, comprising:
   a first extraction unit for extracting a plurality of consecutive pixels used for determination from first image data as a group;
   a second extraction unit for extracting pixels corresponding to the pixels extracted from the first image data, from second image data;
   an accumulation unit for accumulating differences in value between the corresponding pixels extracted by the first and second extraction units; and
   a determination unit for determining whether the accumulated value per image data exceeds a threshold value, wherein each of the first and second extraction units extracts first pixels from odd fields and second pixels from even fields, the first and second pixels being not adjacent to each other, and if the accumulated value exceeds the threshold value, the determination unit determines that a scene change is detected between the plurality of pieces of corresponding image data.

2. The scene change determination device according to claim 1, wherein the first extraction unit extracts a plurality of pixels which continues in a line of image data being processed and whose data length is equal to or smaller than a bus width of a system bus every time.

3. A data transfer device for transferring image data to a transfer destination memory area, based on a data transfer request from a requester and determining a scene change between a plurality of pieces of image data to be transferred, comprising:

a transfer control unit for controlling transfer of image data according to the data transfer request;

a first extraction unit for extracting a plurality of consecutive pixels used for determination from image data being currently transferred via the transfer control unit, as a group;

a second extraction unit for extracting pixels corresponding to the pixels extracted from the image data being currently transferred, from image data already transferred to the transfer destination memory area via the transfer control unit an accumulation unit for accumulating differences in value between the corresponding pixels extracted by the first and second extraction units; and a determination unit for determining whether an accumulated value per image data exceeds a threshold value, wherein the image data is transferred by an interlace method, each of the first and second extraction units extracts first pixels from odd fields and second pixels from even fields, the first and second pixels being not adjacent to each other, and if the accumulated value exceeds the threshold value, the determination unit determines that a scene change is detected between the plurality of pieces of corresponding image data.

4. The data transfer device according to claim 3, wherein the first extraction unit extracts a plurality of pixels which continue in a line of image data being processed and whose data length is equal to or smaller than a bus width of a system bus every time.

5. A scene change determination method for determining a scene change between a plurality of pieces of image data transferred by an interlace method, comprising, using a central processing unit to perform the steps of:

a first extraction step of extracting a plurality of consecutive pixels used for determination from first image data as a group;

a second extraction step of extracting pixels corresponding to the pixels extracted from the first image data, from second image data;

an accumulation step of accumulating differences in value between a plurality of corresponding pixels extracted in the first and second extraction steps; and a determination step of determining whether an accumulated value per image data exceeds a threshold value, wherein first pixels extracted from odd fields and second pixels extracted from even fields in each of the first and second extraction steps are not adjacent to each other, and in the determination step, if the accumulated value exceeds the threshold value, it is determined that a scene change is detected between a plurality of pieces of corresponding image data.

6. The scene change determination method according to claim 5, wherein in the first extraction step, a plurality of pixels which continues in a line of image data being processed and whose data length is equal to or smaller than a bus width of a system bus is extracted every time.

7. A data transfer method for transferring image data to a transfer destination memory area, based on a data transfer request from a requester and determining a scene change between a plurality of pieces of image data to be transferred, comprising, using a central processing unit to perform the steps of:

a first extraction step of extracting a plurality of consecutive pixels used for determination from image data being currently transferred via a transfer control unit for controlling transfer of the image data, as a group;

a second extraction step of extracting pixels corresponding to the pixels extracted from the image data being currently transferred, from image data already transferred to the transfer destination memory area via the transfer control unit;

an accumulation step of accumulating differences in value between the corresponding pixels extracted in the first and second extraction steps; and a determination step of determining whether an accumulated value per image data exceeds a threshold value, wherein the image data is transferred by an interlace method, first pixels extracted from odd fields and second pixels extracted from even fields in each of the first and second extraction steps are not adjacent to each other, and in the determination step, if the accumulated value exceeds the threshold value it is determined that a scene change is detected between the plurality of pieces of corresponding image data.

8. The data transfer method according to claim 7, wherein in the first extraction step, a plurality of pixels which continue in a line of image data being processed and whose data length is equal to or smaller than a bus width of a system bus is extracted every time.

* * * * *